United States Patent [19]
Blackwood

[11] 3,817,028
[45] June 18, 1974

[54] CHAIN LINK SHACKLE

[76] Inventor: Henson U. Blackwood, 830 S. Fairfax Rd., Bakersfield, Calif. 93307

[22] Filed: Mar. 29, 1972

[21] Appl. No.: 239,056

[52] U.S. Cl. ............................................ 59/86, 59/93
[51] Int. Cl. ...................................... F16g 15/06
[58] Field of Search .................. 59/86, 93, 85, 78

[56] References Cited
UNITED STATES PATENTS

| 251,464 | 12/1881 | Rogers | 59/86 |
|---|---|---|---|
| 268,785 | 12/1882 | Duling | 59/86 |
| 432,735 | 7/1890 | Helm | 59/86 |
| 618,086 | 1/1899 | Haase | 59/86 |
| 2,010,853 | 8/1935 | Dyer | 59/86 |
| 2,259,880 | 10/1941 | Ehmann | 59/86 |
| 3,330,107 | 7/1967 | Klein | 59/86 |

*Primary Examiner*—Charles W. Lanham
*Assistant Examiner*—Gene P. Crosby

[57] ABSTRACT

A releasable shackle for attachment into a chain and comprising a key-shaped pin with opposite shoulders rotatively positioned by the chain link opening through which it is engaged and thereby locked between spaced legs of the shackle, and particularly adapted to be used as a safety chain connector.

3 Claims, 5 Drawing Figures

PATENTED JUN 18 1974
3,817,028
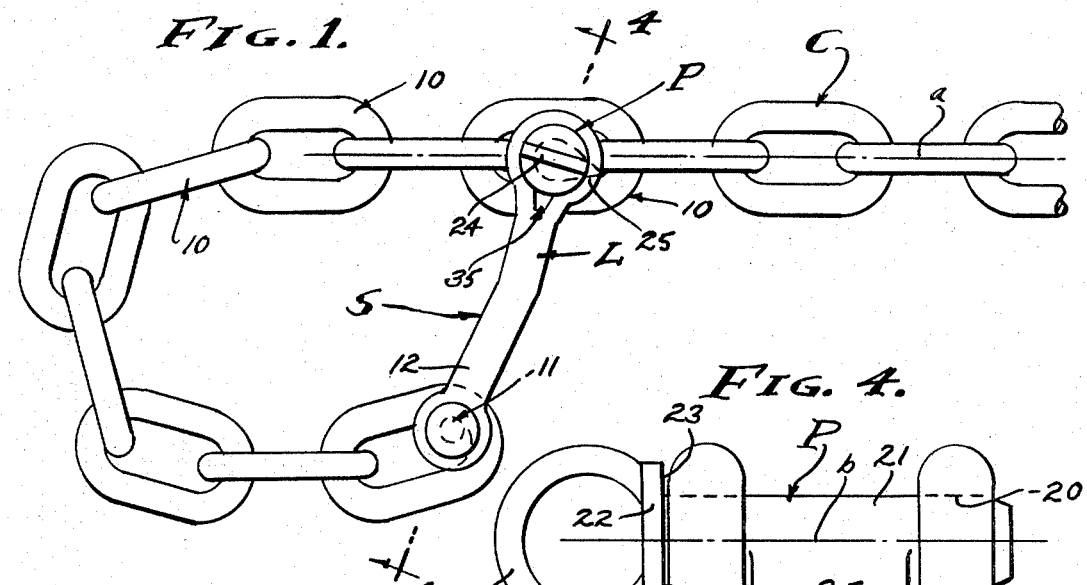
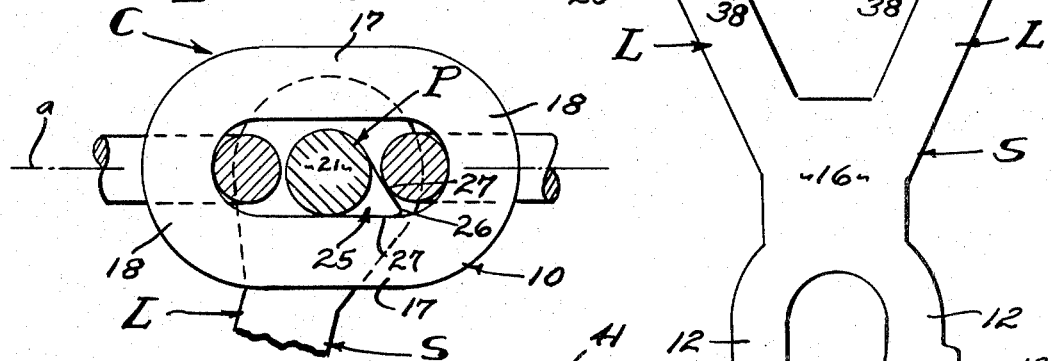
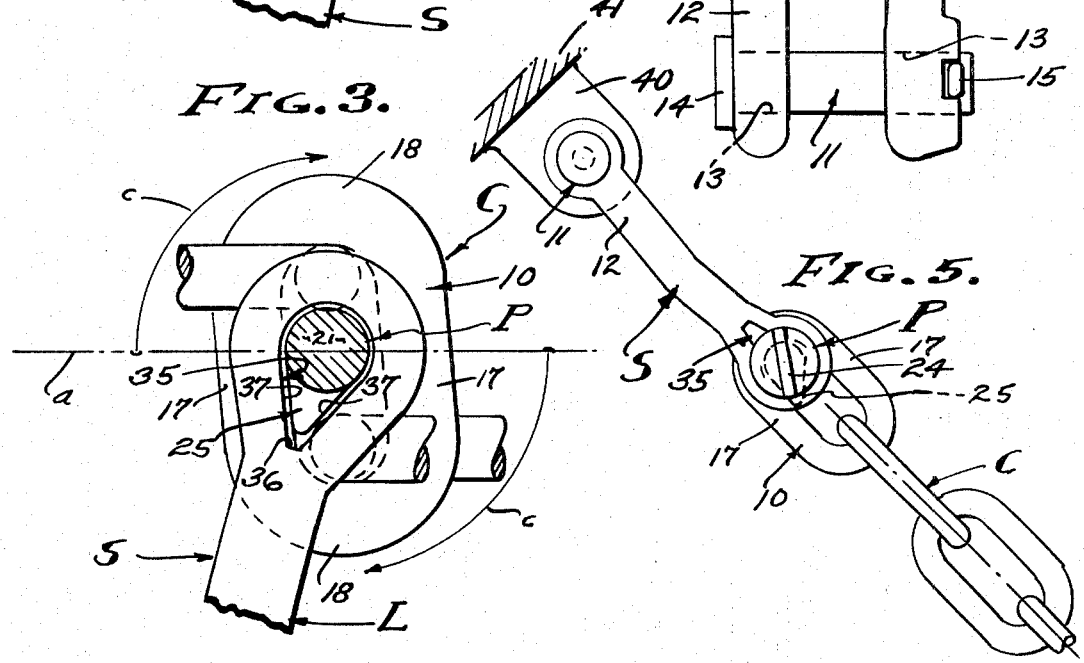

CHAIN LINK SHACKLE

BACKGROUND

The use of link chain is wide spread and it is normal to connect sections thereof by means of shackles, said shackles comprising a U-shaped body with spaced legs having aligned openings to receive a removeable pin. In the interest of safety, shackle pins are required to be secured by cotters and/or by lock wires, or the chains are simply knotted and tied, and in any case doubtful security is attained; reference being made for example to safety chains applied to trailer hitches and the like. Needless to say, the tying of chains is haphazard and not altogether reliable, while the use of wires and cotter pins is a doubtful resort when it is realized that wires and cotters are more than likely reused and grow weak with repeated bending. Therefore, it is an object of this invention to provide a safety shackle that is secured by virtue of a lock pin rotatively positioned within the confines of the link opening through which it is anchored. With the present invention, advantage is realized from the tendancy of a shackle to pull in a general direction, which is the case with a safety loop of chain wherein the end section thereof is turned back and secured to itself, in this case by the safety shackle. Thus, the shackle inherently leads toward the end of the loop, and each link of the chain inherently tends to extend longitudinally thereof. It is these inherencies which are employed as later described to orient the lock pin of the present invention in a secure manually disengageable position.

FIELD OF INVENTION

This invention relates to the securement of chain shackles into sections of chain, at the bitter end or as a lateral connection thereto. Cooperative reliance of the chain structure with the shackle and its lock pin results in a reliable securement adapted as a primary connection and/or for example to form a safety loop at the bitter end of a chain. Thus, it is an object to provide a safety shackle that is securable to either the bitter end of a chain or laterally into said chain, by cooperating with one of the link openings.

With the present invention, the cooperative link opening involves said one link and the one or two adjacent links extending therefrom in opposite directions. Thus, each link opening is characteristically formed and the lock pin is unique in its adaptation thereto to be rotatively positioned for retension between the shackle legs. A characteristic feature of the pin securement is the limited rotatability of the said one chain link and of the lock pin engaged therewith for securement of the shackle.

SUMMARY OF INVENTION

This invention resides in a shackle and pin structure, and in the combination thereof with a link chain to which the shackle is reliably secured. Accordingly, a typical or conventional chain C is shown which involves a series of interconnected links 10 and each with an opening therethrough. In FIG. 1 the safety shackle S is shown fastened to the bitter end of the chain C by an anchor pin 11 extended through and between a pair of spaced anchor legs 12, and comprises the removeable lock pin P extended through and between a pair of shackle legs L. In FIG. 5 the safety shackle S is shown fastened to an ear 40 projecting from an anchor plate 41. The anchor pin 11 and legs 12 can vary widely and do not restrict this invention, and for example the shackle legs L can be secured in any suitable fashion as a permanent part or removeable part of the chain end as shown in FIG. 1 as an anchor or the like as shown in FIG. 5. It is the pin P and shackle legs L with which this invention is concerned.

DRAWINGS

The various objects and features of this invention will be fully understood from the following detailed description of the typical preferred forms and applications thereof, throughout which description reference is made to the accompanying drawings, in which:

FIG. 1 is a side elevation of a chain end section tensioned along an axis $a$ with the safety shackle of the present invention locked in working position.

FIG. 2 is an enlarged longitudinal sectional view of the one link into which the safety shackle is connected as shown in FIG. 1.

FIG. 3 is a view similar to FIG. 2 illustrating the manner in which the chain link is revolved for disengagement of the lock pin of the safety shackle.

FIG. 4 is a longitudinal elevation of the safety shackle removed from the chain and taken as indicated by line 4—4 on FIG. 1.

FIG. 5 is a view similar to FIG. 1 showing another application of the safety shackle along axis $a$.

PREFERRED EMBODIMENT

Referring now to the drawings, a typical safety shackle installation is shown in FIG. 1 wherein the safety shackle S is secured to the end most link 10 of chain C by means of the removeable pin 11 secured between the spaced legs 12. The legs 12 have aligned bearing openings 13 and the complementary pin body of cylinder form has a head 14 at one end and a cotter pin 15 installed at the other end, both outside the legs 12 for securement of the shackle onto the bitter end of the chain C. The body or bridge 16 of the shackle holds the legs rigid relative to each other.

The chain C is shown in its typical form, comprised of elongated links 10 each having a pair of spaced elongated and parallel side portions 17 integrally joined by opposite semi-circular end portions 18. The two pairs of portions 17 and 18 forming the substantially identical links are usually round in cross section as shown and have a nominal diameter which determines the dimensional size of the chain. The side portions 17 are spaced apart internally approximately one and a half said dimensional diameter, for ample clearance and freedom of movement; while the end portions 18 are then spaced apart longitudinally approximately four of said dimensional diameters; and all of which varies somewhat with different manufacturers but which nevertheless remain more or less standardized. Consequently, there is a substantial opening through each link 10 and which is diminished by the inclusion therein of the two joining links that extend in opposite directions. Each successive link 10 is, of course, disposed in a plane normal to the link to which it is connected, there being space between the opposite connected links and lateral space or substantial clearance between the side portion 17 and portion 18 of each link to which it is connected.

In accordance with the present invention, the shackle S is an elongated structure that extends a distance of one and preferably about two chain links. The legs L are parallel projections of the bridge 16 and have aligned bearing openings 20 disposed transversely therethrough on an axis $b$ spaced more than one-half a link distance from said bridge 16. Thus, a link 10 centered around the lock pin P can revolve within the confines of the shackle S, the legs L being spaced so as to permit positioned entry therebetween of the normally disposed connected links.

The lock pin P which characterizes this invention is manually disengageable to extend through the bearing openings 20 and between the legs L, and which comprises a cylindrical bolt-shaped body 21 freely slideable through and rotatable in the openings 20. A head 22 projects radially from the body at one end, presenting a stop shoulder 23 engageable with the outside of one of said links, and in practice, a conspicious turn indicating handle 24 projects therefrom for manual operation. As shown, the handle 24 is a ring disposed in a plane coincidental with the turning axis $b$.

In accordance with this invention, the diameter of the pin body 21 substantially occupies the space between the opposite connected links within the opening of the link 10 to be connected to, and a key 25 projects laterally from the body 21 to occupy a clearance space between the side portion 17 and portion 18 of a connected link. The key 25 is rotatably stopped by the opposite link portions 17. Referring to FIG. 2 of the drawings it will be seen that the key 25 is advantageously of tooth-shape being pointed at 26 with convergent faces 27 tangent to the outer diameter wall of the pin body 21. The tooth form of key 25 is substantial and occupies the clearance space into which it projects, and is held there by virtue of the body 21 being substantial and occupying the space between the opposite connected links; it being understood that considerable working clearance is provided in such chain works. It is significant that tension of the chain C along the axis $a$ maintains the rotative position of the lock pin P, as shown, with shackle legs L extending at an acute angle in a direction away from the key 25.

Referring now to FIG. 4 of the drawings it will be seen that the shackle leg L which stops the head 22 of lock pin P is provided with a keyhole 35 (see FIG. 3) complementary in shape to the key 25 and pointed at 36 with complementary faces 37 tangent to the bearing openings 20 and adapted to freely pass the said key. The keyhole 35 projects in the direction of the body bridge 16 so as to be completely out of alignment with the key 25 when it is positioned as in FIG. 2. As best illustrated in FIG. 4 the key 25 projects from the lock pin body 21 to occupy the space between legs L and has opposite shoulders 38 to engage within said legs when out of alignment with said keyhole 35, thereby locking the body in working position.

From the foregoing, it will be seen that the parts and elements involved are few and simple, but that the operation of the shackle structure and combination with a chain is quite unobvious, reference being made to FIG. 3 of the drawings. Notice that the link 10 through which the lock pin P is projected has been rotated on axis $b$ in the direction of arrows $c$ (by manipulation) with a corresponding rotation of the lock pin P and its key 25, but without rotation of the shank S. Consequently, the key 25 of lock pin P is brought into alignment with the keyhole 35 for subsequent extraction and/or reinsertion thereof. However, when in use and under any tension or stress whatsoever, the chain C operates along axis $a$ to ensure a reliable shackle connection as is illustrated in FIG. 1. Referring to FIG. 5 of the drawings, notice that the key 25 is stopped os as to occur between the side portions 17 of the chain link 10, thereby keeping the key 25 within the confines of the shackle legs.

Having described only a typical preferred forms and applications of my invention, I do not wish to be limited or restricted to the specific details herein set forth, but wish to reserve to myself any modifications or variations that may appear to those skilled in the art.

I claim:

1. In combination: a link chain comprising, a series of interconnecting links and each having spaced parallel side portions integrally formed with opposite semi-circular end portions and forming an opening therethrough receiving the semi-circular end portions of a pair of oppositely extending links and leaving a first space therebetween, and said oppositely extending links having a cross section uniformly less than the space between said parallel side portions thereof and leaving a second clearance space between a side portion cross section of the interconnecting link; and a shackle comprising a body having a pair of spaced legs with aligned bearing ends laterally engageable over the opening of the interconnecting chain link, there being a keyhole through one bearing end and angularly aligned with the leg, and a removeable lock pin rotatively engageable in the bearing ends of said spaced legs and occupying the first mentioned space and having a radially projecting key with opposite shoulders engageable between the legs and insertable through the aforementioned keyhole and occupying the second mentioned clearance space and engageable with a side portion of the interconnecting link and held thereby out of alignment with said keyhole.

2. The combination of a link chain and safety shackle as set forth in claim 1, wherein the key is a radially projecting pointed element extending longitudinally of the lock pin, having opposite faces tangent to the body of said pin.

3. The combination of a link chain and safety shackle as set forth in claim 1, wherein the key is a radially projecting pointed element extending longitudinally of the lock pin and having opposite faces tangent to the body of said pin, and wherein the said keyhole is of complementary cross section freely passing the lock pin and its projecting key.

* * * * *